US008363545B2

(12) United States Patent
Young et al.

(10) Patent No.: US 8,363,545 B2
(45) Date of Patent: Jan. 29, 2013

(54) EFFICIENT ETHERNET LAN WITH SERVICE LEVEL AGREEMENTS

(75) Inventors: Ken Young, Kanata (CA); Pablo Frank, Ottawa (CA); Chris Barrett, Nepean (CA); Brian Smith, Ottawa (CA); Natalie Giroux, Ottawa (CA)

(73) Assignee: Ciena Corporation, Hanover, MD (US)

( * ) Notice: Subject to any disclaimer, the term of this patent is extended or adjusted under 35 U.S.C. 154(b) by 748 days.

(21) Appl. No.: 11/706,756

(22) Filed: Feb. 15, 2007

(65) Prior Publication Data
US 2008/0198747 A1 Aug. 21, 2008

(51) Int. Cl.
*H04L 1/00* (2006.01)
(52) U.S. Cl. .......................... 370/230; 370/235; 370/252
(58) Field of Classification Search .......... 370/230–234, 370/252–253, 400–401, 468
See application file for complete search history.

(56) References Cited

U.S. PATENT DOCUMENTS

| 5,859,837 | A | 1/1999 | Crayford |
| 6,904,286 | B1 | 6/2005 | Dantu |
| 7,453,805 | B2 * | 11/2008 | Velev et al. ................ 370/231 |
| 2002/0176361 | A1 * | 11/2002 | Wu et al. .................... 370/231 |
| 2002/0181396 | A1 | 12/2002 | Chen et al. |
| 2003/0058880 | A1 | 3/2003 | Sarkinen et al. |
| 2003/0063560 | A1 | 4/2003 | Jenq et al. |
| 2003/0133406 | A1 | 7/2003 | Fawaz et al. |
| 2003/0147347 | A1 | 8/2003 | Chen et al. |
| 2003/0156542 | A1 | 8/2003 | Connor |
| 2004/0037223 | A1 | 2/2004 | Harrison et al. |
| 2004/0081090 | A1 | 4/2004 | Hara et al. |
| 2004/0151181 | A1 | 8/2004 | Chu et al. |
| 2004/0156345 | A1 | 8/2004 | Steer et al. |
| 2004/0170179 | A1 | 9/2004 | Johansson et al. |
| 2004/0170186 | A1 | 9/2004 | Shao et al. |
| 2005/0008014 | A1 | 1/2005 | Mitra et al. |
| 2005/0141523 | A1 | 6/2005 | Yeh et al. |
| 2005/0152269 | A1 | 7/2005 | Liu |
| 2005/0243711 | A1 | 11/2005 | Alicherry et al. |
| 2006/0120385 | A1 * | 6/2006 | Atchison et al. ............. 370/400 |
| 2006/0274770 | A1 * | 12/2006 | Bottiglieri et al. ........... 370/230 |
| 2007/0030809 | A1 * | 2/2007 | Dayama ........................ 370/237 |

FOREIGN PATENT DOCUMENTS
EP 1124356 A2 8/2001
WO WO 2004057817 A2 7/2004

\* cited by examiner

*Primary Examiner* — Pao Sinkantarakorn
(74) *Attorney, Agent, or Firm* — Clements Bernard PLLC; Christopher L. Bernard; Lawrence A. Baratta, Jr.

(57) ABSTRACT

A method of controlling the flow of data packet traffic from a first point to at least two second point in an Ethernet telecommunications network having a multiplicity of nodes interconnected by multiple network links, comprises monitoring the level of utilization of a link between the first and second points, generating flow control messages representing the level of utilization and transmitting the control messages to the first point, and using the states represented in the flow control messages as factors in controlling the rate at which the packets are transmitted from the first point to the second point. A method of controlling the flow of data packet traffic through an Ethernet telecommunications network having a multiplicity of nodes interconnected by multiple network links, comprises receiving incoming data packet traffic from multiple customer connections at a first node for entry into the network via the first node, the first node having an ingress trunk, and limiting the rate at which the incoming data packets are admitted to the network via the ingress trunk.

12 Claims, 3 Drawing Sheets

EFFICIENT ETHERNET LAN WITH SERVICE LEVEL AGREEMENTS

FIELD OF THE INVENTION

The present invention generally relates to Ethernet access and, in particular, to bandwidth-efficient Ethernet LAN with Service Level Agreements.

BACKGROUND OF THE INVENTION

Ethernet is an emerging opportunity for telecommunication carriers. This service provides point-to-point and point-to-multipoint Ethernet connectivity and offers different types of services with many combinations of quality objectives, such as loss, delay and bandwidth. This opportunity is created by the access network quickly becoming a bottleneck as new applications demand more and more bandwidth. Traditional access equipment using SDH and xDSL do not offer the speeds required to transport all the new multimedia applications such as triple-play, Fixed-Mobile-Convergence (FMC) and IP multimedia sub-systems (IMS).

To address these access challenges, telecommunications carriers have selected Ethernet as the technology to rapidly deploy a wide-ranging variety of services and applications without the need to constantly modify the network infrastructure. Enterprises have long used Ethernet as the technology to support a variety of applications requiring different qualities of service (QoS) from the network. Carriers are leveraging this flexibility and are standardizing on this technology to offer data access services.

Using this service definition, existing network elements which offer network access using Ethernet technology are not designed to make maximum use of the legacy network links existing at the edge of the carrier networks. Many access technologies such as DSL or WiMAX are prone to errors which affect the link speed. The network devices are unable to react to these errors to ensure that the service level agreements are met. The following inventions are focused on addressing these challenges.

When a telecommunications provider offers an Ethernet LAN (E-LAN), a service level agreement (SLA) is entered with the customer, defining the parameters of the network connections. As part of this agreement, a bandwidth profile is defined in terms of Committed Information Rate (CIR), Committed Burst Size (CBS), Excess Information Rate (EIR) and Excess Burst Size (EBS). The CIR guarantees a minimum bandwidth to a connection while the EIR allows the connection to send at higher bandwidth when available.

Current Ethernet network implementations handle congestion locally where it occurs, by discarding overflow packets. Also, E-LAN requires duplication to support unicast miss, multicast and broadcast. This wastes bandwidth in the network in two ways:

1. bandwidth capacity is wasted as a result of retransmission of packets by higher layer protocols (e.g., TCP), and
2. packets are lost throughout the network, wasting precious upstream bandwidth which could be used by other connections generating more revenues for the carriers.

In order to meet the QoS, the Service Provider (SP) allocates an amount of bandwidth, referred to herein as the Allocated Bandwidth (ABW), which is a function of the CIR, CBS, EIR, EBS and the user line rate. Unless CBS is extremely small, the ABW is greater than the CIR in order to guarantee the QoS even when connections are bursting within the CBS.

To implement the Ethernet service in a provider's network, sufficient bandwidth needs to be allocated to each connection to meet the QoS, even though not always used, leading to inefficiencies. The service provider generally over-provisions the network in order to ensure that sufficient traffic gets through such that the application performance does not deteriorate.

When a customer subscribes to an E-LAN to receive connectivity between multiple sites, the SP needs to allocate an amount of bandwidth at least equal to ABW for each possible path in the E-LAN in order to mesh all the sites, making the service unscalable and non-profitable. E-LAN can also provide different bandwidth profiles to different sites where a site needs to send more or less information. One site can talk at any time to another site (point-to-point or "pt-pt"—by using unicast address of the destination), or one site can talk at any time to many other sites (point-to-multipoint or "pt-mpt"—by using Ethernet multicast address). Also one site can send to all other sites (broadcast—by using Ethernet broadcast address).

In FIG. 1, an E-LAN is provisioned among five customer sites 101 (sites 1, 2, 3, 4 and 5) in a network consisting of five nodes 102 (nodes A, B, C, D, E and F) connected to each other using physical links 103. The E-LAN can be implemented using VPLS technology (pseudowires with MPLS or L2TP) or traditional crossconnects with WAN links using PPP over DSC. The E-LAN can also be implemented using GRE, PPP or L2TP tunnels.

For this example, the physical links are 100 Mbps. The customer subscribes to an E-LAN to mesh its sites with a CIR of 20 Mbps and an EIR of 50 Mbps. In order to guarantee that each site can transmit the committed 20 Mbps and the burst, the SP needs to allocate a corresponding ABW of 30 Mbps between each possible pair of sites 104 such that if site 1 sends a burst to site 5 while site 4 sends a burst to site 5, they each receive the QoS for the 20 Mbps of traffic. Since any site can talk to any other site, there needs to be sufficient bandwidth allocated to account for all combinations. Therefore, in this example, (n−1)×ABW needs to be allocated on the links 104 between B and C, where n is the number of sites in the E-LAN. This situation is clearly un-scalable, as shown in FIG. 1 where the 100 Mbps physical links can only support a single E-LAN.

SUMMARY OF THE INVENTION

In one embodiment, a method of controlling the flow of data packet traffic from a first point to at least two second point in an Ethernet telecommunications network having a multiplicity of nodes interconnected by multiple network links, comprises monitoring the level of utilization of a link between the first and second points, generating flow control messages representing the level of utilization and transmitting the control messages to the first point, and using the states represented in the flow control messages as factors in controlling the rate at which the packets are transmitted from the first point to the second point.

In another embodiment, a method of controlling the flow of data packet traffic through an Ethernet telecommunications network having a multiplicity of nodes interconnected by multiple network links, comprises receiving incoming data packet traffic from multiple customer connections at a first node for entry into the network via the first node, the first node having an ingress trunk, and limiting the rate at which the incoming data packets are admitted to the network via the ingress trunk.

BRIEF DESCRIPTION OF THE DRAWINGS

The invention will be better understood from the following description of preferred embodiments together with reference to the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

As was previously discussed, Ethernet services provide point-to-multipoint connections referred to as E-LAN or V-LAN. With an E-LAN, any site can talk to any one or more sites at a given time. The attributes of this service are defined using an SLA which defines a bandwidth profile and may include quality of service (QoS) objectives such as delay, jitter and loss which must be achieved by the service provider.

Figure 1:
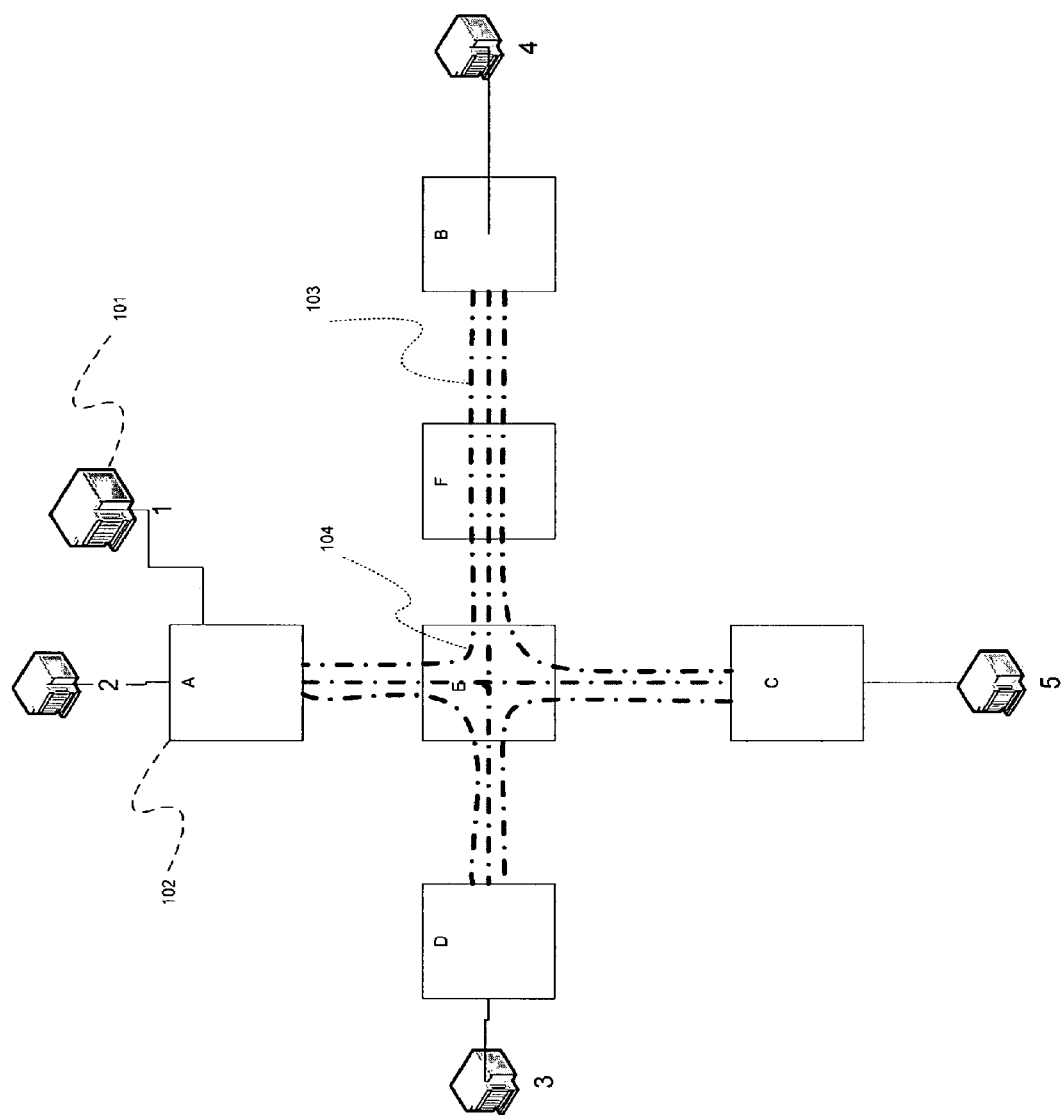
FIG. 1 is a diagram of an example network with existing E-LAN offering.
Figure 2:
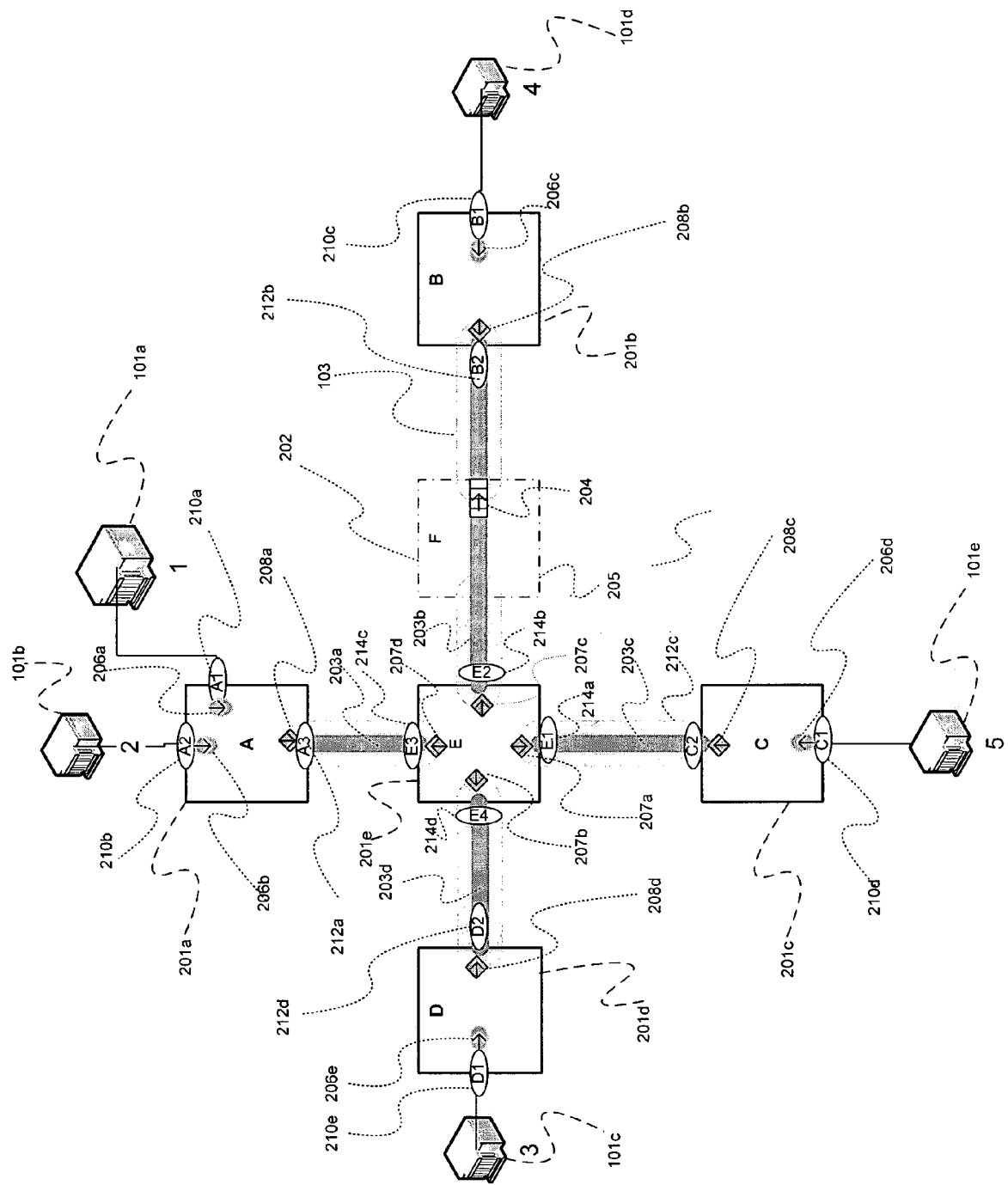
FIG. 2 is a diagram of an example network using network level flow control.

In the embodiment depicted in FIG. 2, an E-LAN that includes multiple customer sites 101a, 101b, 101c, 101d and 101e is created using an Ethernet network having a number of Ethernet switching elements 201a, 201b, 201c, 201d and 201e. The Ethernet switching elements, performing Media Access Control (MAC) switching, can be implemented using native Ethernet or VPLS (layer 2 VPN or MPLS using pseudowires). Transit nodes such as the node 202, performing physical encapsulation switching (e.g., label switching), are used to carry the trunks 203a, 203b, 203c and 203d to establish the E-LAN connectivity. Trunks can be established using pseudowires (MPLS/L2TP), GRE (Generic Routing Encapsulation) or native Ethernet.

Each of the Ethernet switching elements 201a-201e has one or more subscriber interfaces, such as interfaces 210a, 210b, 210c, 210d and 210e, and one or more trunk interfaces, such as interfaces 212a, 212b, 212c, 212d, 214a, 214b, 214c and 214d. The transit nodes do not have trunks or subscriber ports; they provide physical connectivity between a subscriber and an Ethernet switch or between Ethernet switches.

Figure 3:
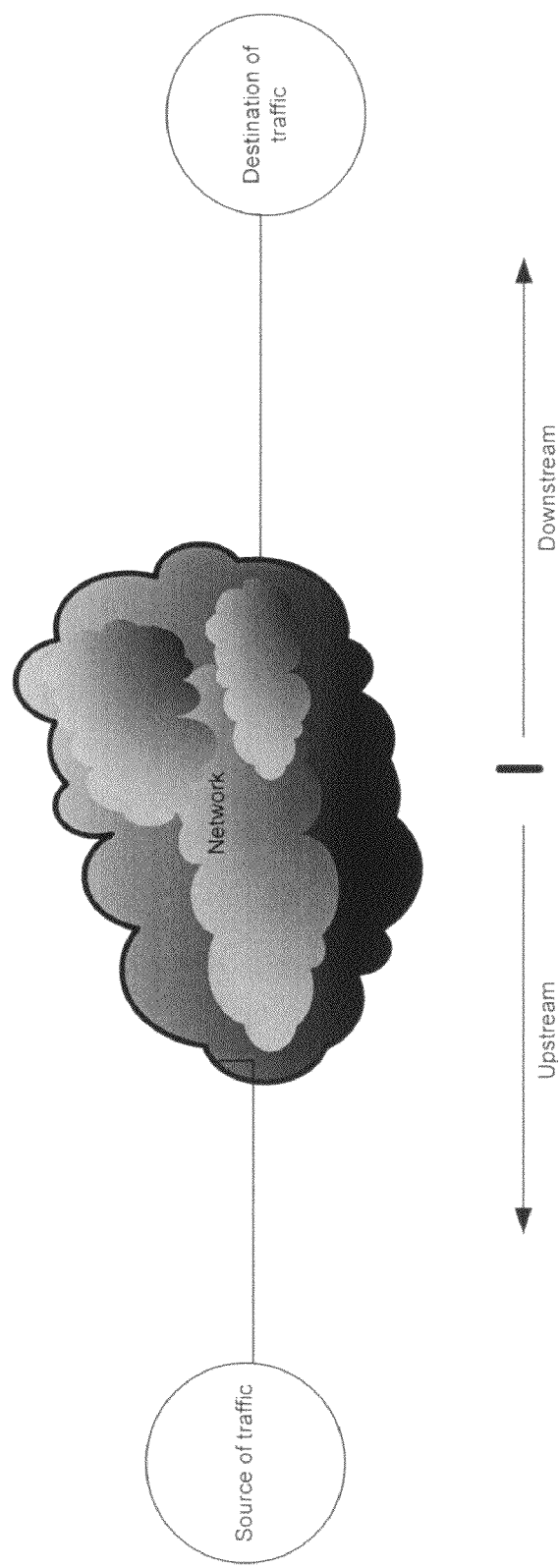
FIG. 3 is a diagram representing the terminology used in the description.

For the purpose of this description, from a given point in the network the term "upstream" refers to the direction going back to the source of the traffic, while the term "downstream" refers to the direction going to the destination of the traffic, as depicted in FIG. 3.

The Ethernet switches 201a-201e and the transit node 202 in the network perform flow control, at the subscriber and trunk levels, respectively, to adapt the transmission rates of the subscribers to the bandwidth available. One way to evaluate the bandwidth available is for each node to monitor the queues sizes at the egress ports or analyze changes in the size of the queue and/or change in delay (e.g., at the queue 204) and buffer traffic outgoing on a link. Suitable flow control techniques are described in more detail in copending U.S. patent application Ser. No. 11/519,503, entitled "SMART ETHERNET EDGE NETWORKING SYSTEM," filed Sep. 12, 2006, which is assigned to the assignee of the present application and is incorporated by reference herein in its entirety.

There are two levels of notification, the MAC-level status control message (MCM) and the trunk-level status control messages (TCM) that are controlling the subscriber and trunk shapers, respectively. Status control messages can include a status level for a link ranging from 0 to n (n 1) depending on the size of the queue, where level 0 indicates that there is no or little contention for the link and n means the queue is nearly full.

For each site in the E-LAN, there is a subscriber shaper 206a, 206b, 206c, 206d or 206e that is responsible for keeping track of the status of the MCM and adapting the traffic rate accordingly. At each trunk interface 212a, 212b, 212c and 212d there is a pair of trunk shapers 207a, 207b, 207c, 207d, 208a, 208b, 208c and 208d, which dynamically shape the traffic according to the TCM. The trunk shapers modify the transmission rate between maximum and minimum trunk rates depending on the status control message. The modification can be done in multiple programmable steps using multiple status levels. The maximum can correspond to the physical line rate, or the configured LAN (CIR+EIR). The minimum trunk rate can correspond to CIR. The shaper is a rate-limiting function that can be implemented using traffic shaping functions or policing functions.

At least one subscriber shaper, such as shapers 206a, 206b, 206c, 206d and 206e, is located at each subscriber interface 210a, 210b, 210c, 210d and 210e to shape the traffic between maximum and minimum subscriber rates depending on the status level indicated in the MCM. The maximum and minimum subscriber rates can correspond to the (CIR+EIR) and CIR, respectively. The subscriber shaper can also be located on the customer side of the UNI. The MCM information can also be carried over the UNI to the application to extend the control loop.

Each transit node tracks the status of its queues and/or buffers and, if necessary, it sends the TCM according to the level of congestion and current state to the upstream nodes such that the corresponding shapers adapt to the status of the transit node. Each Ethernet switch tracks the status of its queues and creates MCM notifications when necessary, and also tracks downstream MCM status for each destination MAC address. It also takes into account the TCM provided by the transit nodes.

The network can include one or more E-LANs with the same characteristics.

Point-to-Point Transmission

Based on the network described above (FIG. 2), an example of a flow-controlled pt-pt transmission is provided. Assume site 5 sends traffic to site 4, but there is contention on the link 103 at node F 202 because of other traffic (not shown) sharing the same link 103.

The queue in node F 204 grows, and a TCM is sent to node E 201e which maintains the status information and controls the trunk shaper 207c. The trunk shaper adapts the rate according to the TCM. As the trunk shaper slows its rate, the trunk shaper queue grows, and the node E enters the flow control mode at the MAC level and starts generating MCM upstream. Another embodiment sends the MCM upstream immediately upon receipt. Since traffic is originating from site 5 101e, node E sends the MCM notification to node C 201c through interface E1 214a. Node E keeps track of the trunk status through the trunk shaper queue status and also keeps track of the MCM. Each Ethernet switch maintains a table of the status of its links.

An example of the table for node E, based on the above scenario, is as follows:

| Node E status table | | | |
|---|---|---|---|
| Destination MAC address | Local status | Downstream | Interfaces Notified |
| Site 4 | Level 3 | Level 3 | E1 |

Node E notifies node C of the contention through MCM. The subscriber shaper 206d controlling the site 5 to site 4 transmissions is modified according to the MCM. Node C updates its MAC status table to reflect the status of the path to site 4. It also includes information to indicate that the user-network interface (UNI) 210d to site 5 has been notified. An example of the table is as follows:

| Node C status table | | | |
|---|---|---|---|
| Destination MAC address | Local status | Downstream | Interfaces Notified |
| Site 4 | Level 0 | Level 3 | C1 |

Each node can optionally keep track of congestion downstream, and only convey worst-case congestion upstream to the source in order to reduce overhead.

The node uses the table to set the shapers of any subscribers trying to transmit to any destination.

Now, if site 2 201a starts to send traffic to site 4, node E 201e receives the traffic on interface E3 214c. Since interface E3 is not in the list of interfaces notified in its status table, node E sends a MCM to node C with the current level as it starts to receive traffic. Node C 201c updates its status table accordingly and modifies the shaper controlling the traffic of site 2 206b. Node E updates its table accordingly:

| Node E status table | | | |
|---|---|---|---|
| Destination MAC address | Local status | Downstream | Interfaces Notified |
| Site 4 | Level 3 | Level 3 | E1, E3 |

The node A 201a status table includes the following information:

| Node A status table | | | |
|---|---|---|---|
| Destination MAC address | Local status | Downstream | Interfaces Notified |
| Site 4 | Level 0 | Level 3 | A2 |

If site 1 subsequently sends to site 4, then node 1 already knows the status of the path and sets the shaper of site 1 accordingly while updating the table as follows:

| Node A status table | | | |
|---|---|---|---|
| Destination MAC address | Local status | Downstream | Interfaces Notified |
| Site 4 | Level 0 | Level 3 | A2, A1 |

Congestion can happen not only on a transit node but at any egress link, including egress to a subscriber UNI and, depending on the node architecture, at intermediate points in the nodes.

When the congestion level at the queue 204 reduces, the transit node 202 indicates to node E 201e via a TCM lower level of congestion. Node E updates the corresponding entry in the status table, updates its trunk shaper and sends status control message with a lower to level to all interfaces that had been notified of the status (in this case E1 and E3) such that node A and node C can also update their entries and control their shapers. The entries in the tables are updated as follows:

| Node E status table | | | |
|---|---|---|---|
| Destination MAC address | Local status | Downstream | Interfaces Notified |
| Site 4 | Level 1 | Level 1 | E1, E3 |

| Node C status table | | | |
|---|---|---|---|
| Destination MAC address | Local status | Downstream | Interfaces Notified |
| Site 4 | Level 0 | Level 1 | C1 |

| Node A status table | | | |
|---|---|---|---|
| Destination MAC address | Local status | Downstream | Interfaces Notified |
| Site 4 | Level 0 | Level 1 | A2, A1 |

When a MCM at level 0 is received by node C, it clears the corresponding entry in the status table and sends a status control message with the level 0 to all interfaces that had been notified of the status.

If a node ages a MAC address because it has not been used by any of its interfaces for a predetermined amount of time, it clears the corresponding entry in the status table and sends a MCM to all the interfaces that had been using the address. The node also indicates to the downstream node that it has aged the MAC address so that the downstream node can remove it from its list of notified interfaces.

For example, if node E 201e determines that site 5 101e has not sent traffic for a predetermined amount of time, node E ages the MAC address of site 5 and sends the notification to interface C1 clearing the status. The node E status table becomes:

| Node E status table | | | |
|---|---|---|---|
| Destination MAC address | Local status | Downstream | Interfaces Notified |
| Site 4 | Level 1 | Level 1 | E3 |

There can be a single subscriber shaper per UNI or multiple, e.g., one for each possible path on the E-LAN. Another possibility is to have a shaper per congestion level. At any given time, a subscriber port can have stations speaking to many other stations in the LAN. While these conversations proceed, each of these stations can be experiencing different levels of congestion across the LAN. As such, the subscriber traffic is metered at different rates based upon the destination addresses. These rates change over time based upon the MCM messages received from downstream nodes. As one embodiment of this subscriber dynamic shaper, there could be three rates used:

1. unicast traffic,
2. multicast traffic, and
3. broadcast and unicast miss.

The contrains the amount of broadcast traffic on the LAN and ensures unicast traffic flow.

Point-to-Multipoint Transmission

The same mechanism can also be applied to point-to-multipoint transmission. The Ethernet switches maintain a table of which of its interfaces is used to reach a given MAC address. In the case of pt-to-mpt, the node maintains a table for each group address of any of its interfaces that are used to reach all the destinations.

Using the same network shown in FIG. 2 as an example, if site 1 101a initiates a pt-mpt transmission to Group 1 and eventually site 3 101c and site 4 101d request to join Group 1, node E maintains the following table and notifies the source (site 1) of the worst case congestion of all sites—in this case level 3:

| Node E status table | | | | |
|---|---|---|---|---|
| Destination address | Interfaces used | Local status | Downstream | Interfaces Notified |
| Site 1, Group 1 | E4 | Level 0 | Level 0 | E3 |
| Site 1, Group 1 | E2 | Level 3 | Level 0 | E3 |

If another subscriber located on node D were to request to join Group 1, no change to the table would be necessary as interface E4 is already notified of the congestion level. In node A,

| Node A status table | | | | |
|---|---|---|---|---|
| Destination address | Interfaces used | Local status | Downstream | Interfaces Notified |
| Group 1 | A3 | Level 0 | Level 3 | A1 |

This scheme applies to multicast, anycast and broadcast. Any type of multicast addressing can be used for these tables, including PIM, IGMPv2, IGMPv3 and MLD.

Node A uses the table to set the dynamic shaper to the rate corresponding to the worst case status of the group addresses, in this case site 4, and therefore slows down transmission to all destinations to account for the slowest leaf.

A similar approach can be used for broadcast and anonymous multicast.

Using this type of flow control on an E-LAN allows minimizing the amount of bandwidth allocated for each path while still meeting the QoS objectives. In the above example, only the CIR needs to be allocated once for each path in the network, as opposed to allocating the ABW for each combination of possible paths.

Rate-Limited E-LAN

The entire E-LAN bandwidth may be limited by rate limiting the E-LAN to an E-LAN-specific bandwidth profile that is independent of the customer bandwidth profile. The bandwidth profile defines the maximum rate that the trunk shapers 208a, 208b, 208c and 208d can achieve at the ingress to the E-LAN. All the sites that are transmitting through the E-LAN are rate-limited by the trunk bandwidth such that the total E-LAN bandwidth consumed is controlled with limited or no packet loss in the E-LAN, allowing for deterministic engineering and reduced packet loss. Using a rate-limited E-LAN allows significant reduction of the bandwidth allocated to a single E-LAN while maintaining the SLA.

For example, the E-LAN is configured such that each ingress trunk 208a, 208b, 208c and 208d is rate-limited to 10 Mbps over a link speed of 100 Mbps. Each site transmitting on the ingress trunk sends within its bandwidth profile using the subscriber shaper, but it is further confined within the rate limited by the trunk, so the total traffic transmitted by all the sites on one node does not exceed the 10 Mbps. By rate limiting at the ingress trunk shaper, MCM flow control can be triggered when multiple subscribers are sending simultaneously.

In another embodiment, the trunks internal to the E-LAN 207a, 207b, 207c and 207d are also rate-limited to further control the amount of bandwidth that is consumed by the E-LAN within the network. These trunks trigger flow control when multiple traffic flows overlap simultaneously, causing queue levels to grow.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A method of controlling the flow of data packet traffic from a first point to at least a second point in an Ethernet LAN telecommunications network having a multiplicity of nodes interconnected by multiple physical network links, comprising using circuitry, monitoring the level of utilization of a link between said first and second points, using circuitry, generating flow control messages representing said level of utilization and transmitting said flow control messages to said first point, wherein said flow control messages comprise notifications at both a subscriber level and a trunk level, and using states represented in said flow control messages as factors in controlling the rate at which said packets are transmitted from said first point to said second point, wherein the states represented in said flow control messages are used to control said rate at both subscriber and trunk levels at a plurality of nodes between said first point and said second point with said subscriber levels controlled at each of said first point and said second point via a subscriber shaper and with said trunk levels controlled at trunk interfaces via a pair of trunk shapers at each of said trunk interfaces.

2. The method of claim 1 which can be used for point-to-multipoint application.

3. The method of claim 1 wherein said subscriber shaper keeps track of the status of said link and adapts said rate accordingly via a MAC-level status control message (MCM).

4. The method of claim 1 wherein said trunk shaper modifies said rate according to a trunk-level status control message (TCM).

5. The method of claim 1 wherein said shapers modify said rate from a maximum contracted rate CIR+EIR down to a minimum rate CIR, in response to said control messages.

6. The method of claim 1 wherein said level of utilization is determined by monitoring the size of a queue at an egress port, or by analyzing changes in at least one of (1) the size of said queue and (2) delays at said queue.

7. The method of claim 1 which said flow control messages include both subscriber status control messages and trunk status control messages.

8. The method of claim 1 which includes sending status control messages to a source of data packets when a link exceeds different levels of utilization.

9. The method of claim 1, further comprising:
using the states represented in said flow control messages as factors in controlling the rate at which said packets are transmitted at said subscriber level from said first point;
using the states represented in said flow control messages as factors in controlling the rate at which said packets are transmitted at said trunk level from said first point; and
using the states represented in said flow control messages as factors in controlling the rate at which said packets are transmitted at said trunk level from an intermediate node between said first point and said second point.

10. A method of controlling the flow of data packet traffic through an Ethernet LAN telecommunications network having a multiplicity of nodes interconnected by multiple physical network links, comprising
using circuitry, receiving incoming data packet traffic from multiple customer connections at a first node for entry into the network via said first node, said first node having an ingress trunk, and
using circuitry, limiting the rate at which said incoming data packets are admitted to the network via said ingress trunk,
wherein said network includes multiple trunks, and said method includes limiting the rate at which data packets are transmitted through said trunks, and
wherein said rate at which data packets are transmitted through said trunks is limited from a maximum configured rate CIR+EIR down to a minimum committed rate CIR in response to control messages.

11. The method of claim 10 wherein said data packets are limited at said ingress trunk, through said trunks, and at an egress trunk via a subscriber shaper and a trunk shaper.

12. A method of controlling the flow of data packet traffic through an Ethernet LAN telecommunications network having a multiplicity of nodes interconnected by multiple physical network links, comprising
using circuitry, receiving incoming data packet traffic from multiple customer connections at a first node for entry into the network via said first node, said first node having multiple ingress trunks,
using circuitry, limiting the rate at which said incoming data packets are admitted to the network via said multiple ingress trunks, and
using circuitry, limiting the rate at which data packets are transmitted through the network via trunks in the network,
wherein said rate at which data packets are transmitted through the network via trunks in the network is limited from a maximum configured rate CIR+EIR down to a minimum committed rate CIR in response to control messages.

* * * * *